United States Patent
Cai et al.

(10) Patent No.: US 11,012,725 B2
(45) Date of Patent: *May 18, 2021

(54) LIVE VIDEO REPLAY METHOD, REPLAY SERVER AND SYSTEM

(71) Applicant: WANGSU SCIENCE & TECHNOLOGY CO., LTD., Shanghai (CN)

(72) Inventors: Xi Cai, Shanghai (CN); Longshi Cai, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 477 days.

This patent is subject to a terminal disclaimer.

(21) Appl. No.: 15/774,832

(22) PCT Filed: Sep. 13, 2017

(86) PCT No.: PCT/CN2017/101633
§ 371 (c)(1),
(2) Date: May 9, 2018

(87) PCT Pub. No.: WO2019/041381
PCT Pub. Date: Mar. 7, 2019

(65) Prior Publication Data
US 2020/0288183 A1    Sep. 10, 2020

(30) Foreign Application Priority Data
Sep. 1, 2017   (CN) .......................... 201710780826.8

(51) Int. Cl.
*H04N 21/2387*    (2011.01)
*H04N 21/2187*    (2011.01)
(Continued)

(52) U.S. Cl.
CPC ..... *H04N 21/2387* (2013.01); *H04N 21/2187* (2013.01); *H04N 21/232* (2013.01); *H04N 21/2393* (2013.01); *H04N 21/47217* (2013.01)

(58) Field of Classification Search
None
See application file for complete search history.

(56) References Cited

U.S. PATENT DOCUMENTS 10,771,824 B1 *   9/2020   Haritaoglu ......... H04N 21/6373
2001/0047516 A1   11/2001  Swain et al.
(Continued)

FOREIGN PATENT DOCUMENTS

CN    101662661 A    3/2010
CN    101917590 A    12/2010
(Continued)

OTHER PUBLICATIONS

The China National Intelleectual Property Administration (CNIPA) the China Search Report for 201710780826.8 dated Apr. 3, 2019 22 Pages.
(Continued)

*Primary Examiner* — Mulugeta Mengesha
*Assistant Examiner* — Charles N Hicks
(74) *Attorney, Agent, or Firm* — Anova Law Group, PLLC

(57) ABSTRACT

A replay method of live videos, includes: receiving a replay request sent by a platform control server, the replay request being directed to a specified video file in a storage server, wherein the specified video file is obtained after a live streaming server records a live video, and the specified video file is uploaded to the storage server by the live streaming server; retrieving, from the storage server, the specified video file to which the replay request is directed; and converting the specified video file to a live video stream, and (Continued)

transmitting the live video stream to the live streaming server to allow the live streaming server to transmit the live video stream to a user client.

20 Claims, 5 Drawing Sheets

(51) Int. Cl.
*H04N 21/232* (2011.01)
*H04N 21/239* (2011.01)
*H04N 21/472* (2011.01)

(56) References Cited

U.S. PATENT DOCUMENTS

| | | | | |
|---|---|---|---|---|
| 2003/0093790 | A1* | 5/2003 | Logan | G11B 27/34 725/38 |
| 2005/0028219 | A1* | 2/2005 | Atzmon | H04N 21/44209 725/116 |
| 2007/0082602 | A1* | 4/2007 | Park | H04H 40/27 455/3.02 |
| 2011/0083073 | A1* | 4/2011 | Atkins | G11B 27/10 715/704 |
| 2011/0276880 | A1* | 11/2011 | Greenfield | H04N 21/6405 715/720 |
| 2014/0143437 | A1 | 5/2014 | Mathur et al. | |
| 2016/0073149 | A1 | 3/2016 | Feng et al. | |
| 2016/0173557 | A1 | 6/2016 | Lee et al. | |
| 2016/0227258 | A1* | 8/2016 | Zhang | H04L 65/605 |
| 2016/0309211 | A1 | 10/2016 | Grasset | |

FOREIGN PATENT DOCUMENTS

| | | |
|---|---|---|
| CN | 101917591 A | 12/2010 |
| CN | 103051929 A | 4/2013 |
| CN | 104469433 A | 3/2015 |
| CN | 105872581 A | 8/2016 |
| CN | 105992049 A | 10/2016 |
| CN | 106385619 A | 2/2017 |
| EP | 1858263 A1 | 11/2007 |
| WO | 2008064356 A1 | 5/2008 |
| WO | 2016077262 A1 | 5/2016 |

OTHER PUBLICATIONS

The China National Intelleectual Property Administration (CNIPA) the China Supplementary Search Report for 201710780826.8 dated Sep. 10, 2019 19 Pages.

The European Patent Office (EPO) The Extended European Search Report for PCT/CN2017/101633 (17897207.1) dated Nov. 23, 2018 10 Pages.

* cited by examiner

LIVE VIDEO REPLAY METHOD, REPLAY SERVER AND SYSTEM

CROSS-REFERENCES TO RELATED APPLICATIONS

This application is a national phase entry under 35 U.S.C § 371 of International Application No. PCT/CN2017/101633 filed on Sep. 13, 2017, which claims priority of Chinese Patent Application No. 201710780826.8, filed with the State Intellectual Property Office of P. R. China on Sep. 1, 2017, the entire contents of all of which are incorporated herein by reference.

FIELD OF THE DISCLOSURE

The present disclosure generally relates to the field of internet technology and, more particularly, relates to a replay method of live videos, a replay server and a system thereof.

BACKGROUND

With the continuous development of internet technology and the ever-increasing speed of the internet, live video streaming service has gradually emerged. During the live video streaming process, an anchor client may locally record the source video through a video recording component. While recording the source video, the anchor client may also send a source video that has finished recording to a server of the live video streaming platform. A user client can then load the corresponding source video from the server of the live video streaming platform. In this way, through the anchor client's transmission of the video stream and the user client's receipt of the video stream, the user client can display the video screens recorded at the anchor client in real time, thereby accomplishing the live video streaming process.

The live video streaming service can satisfy users' demands on real-time streaming relatively well. However, current live video streaming platforms generally store the source videos transmitted by the anchor clients only for a really short period of time, and thus are difficult to satisfy users' replay requests.

BRIEF SUMMARY OF THE DISCLOSURE

The purpose of the present disclosure is to provide a replay method of live videos, a replay server and a system thereof, to provide functions for replaying live videos for users.

To achieve the above purpose, one aspect of the present disclosure provides a replay method of live videos. The method includes: receiving a replay request sent by a platform control server, the replay request being directed to a specified video file in a storage server, wherein the specified video file is obtained after a live streaming server records a live video, and the specified video file is uploaded to the storage server by the live streaming server; retrieving, from the storage server, the specified video file to which the replay request is directed; and converting the specified video file to a live video stream, and transmitting the live video stream to the live streaming server to allow the live streaming server to transmit the live video stream to a user client.

Further, the replay request being directed to the specified video file includes: a storage path in the storage server for the specified video file being included in the replay request.

Further, the platform control server is provided with a designated invocation interface. Accordingly, the method further includes, in response to an invocation request directed to the designated invocation interface started by the platform control server, initiating a video replay service.

Further, the method also includes: receiving a stop replay instruction sent by the platform control server; and forwarding the stop replay instruction to the live streaming server to allow the live streaming server to stop transmitting the live video stream to the user client.

Further, the replay request includes replay cutoff parameters, and the replay cutoff parameters are configured to provide a defined number of times of replay or a defined duration of replay of the live video stream transmitted to the user client. Accordingly, the method further includes: stopping transmitting the live video stream to the user client when a number of times of reply of the live video stream reaches the defined number of times of replay or a duration of replay reaches the defined duration of replay.

Further, the replay request includes a replay start time node. Accordingly, after receiving the replay request sent by the platform control server, the method further includes: determining whether a current time node reaches the replay start time node; and in response to that the current time node reaches the replay start time node, retrieving the specified video file to which the replay request is directed from the storage server.

Further, the replay request is directed to at least two specified video files in the storage server, where each of the at least two specified video files has a corresponding playing sequence number. Accordingly, the method further includes: transmitting live video streams that respectively correspond to the at least two specified video files to the live streaming server based on playing sequence numbers, thereby allowing the live streaming server to transmit the corresponding live video streams to the user client based on the playing sequence numbers.

Further, the method also includes: stopping transmitting the live video streams to the user client when all the live video streams that respectively correspond to the at least two specified video files finish playing.

Further, the replay request includes corresponding numbers of looping times for the at least two specified video files. Accordingly, the method further includes: stopping transmitting the live video streams to the user client when numbers of times of play of all the live video streams that respectively correspond to the at least two specified video files reach the corresponding numbers of looping times.

To achieve the above purpose, another aspect of the present disclosure further provides a replay server. The replay server includes: a replay request receiving module, configured to receive a replay request sent by a platform control server, the replay request being directed to a specified video file in a storage server, wherein the specified video file is obtained after a live streaming server records a live video, and the specified video file is uploaded to the storage server by the live streaming server; a specified video file retrieving module, configured to retrieve, from the storage server, the specified video file to which the replay request is directed; and a live video stream transmitting module, configured to convert the specified video file into a live video stream, and transmit the live video stream to the live streaming server to allow the live streaming server to transmit the live video stream to a user client.

To achieve the above purpose, another aspect of the present disclosure further provides a replay server. The replay server implements the forgoing replay methods.

To achieve the above purpose, another aspect of the present disclosure further provides a replay method of live videos. The method includes: receiving, by a live streaming server, live streaming source data uploaded by an anchor client, recording the live streaming source data as a video file, and storing the recorded video file in a storage server; sending, by a platform control server, a replay request to a replay server, the replay request being directed to a specified video file in the storage server; in response to the replay request, retrieving, by the replay server, the specified video file from the storage server; converting, by the replay server, the specified video file into a live video stream and transmitting the live video stream to the live streaming server; and transmitting, by the live streaming server, the live video stream to a user client.

Further, the replay request being directed to the specified video file includes: a storage path in the storage server for the specified video file being included in the replay request.

Further, the replay request includes replay cutoff parameters, and the replay cutoff parameters are configured to provide a defined number of times of replay or a defined duration of replay of the live video stream transmitted to the user client. Accordingly, the method further includes stopping transmitting, by the live streaming server, the live video stream to the user client when a number of times of reply of the live video stream reaches the defined number of times of replay or a duration of replay reaches the defined duration of replay.

Further, the replay request includes a replay start time node. Accordingly, after sending the replay request to the replay server by the platform control server, the method further includes: determining, by the replay server, whether a current time node reaches the replay start time node; and in response to that the current time node reaches the replay start time node, retrieving the specified video file to which the replay request is directed from the storage server.

Further, the replay request is directed to at least two specified video files in the storage server, where each of the at least two specified video files has a corresponding playing sequence number. Accordingly, the method further includes: transmitting, by the replay server, live video streams that respectively correspond to the at least two specified video files to the live streaming server based on playing sequence numbers; and transmitting, by the live streaming server, the corresponding live video streams to the user client based on the playing sequence numbers.

Further, the replay request also includes corresponding numbers of looping times for the at least two specified video files. Accordingly, the method further includes stopping transmitting, by the live streaming server, the live video streams to the user client when numbers of times of play of all the live video streams that respectively correspond to the at least two specified video files reach the corresponding numbers of looping times.

To achieve the above purpose, another aspect of the present disclosure further provides a replay system for live videos. The system includes a live streaming server, a platform control server, and a replay server implementing the foregoing replay methods. The live streaming server is configured to: receive live streaming source data uploaded by an anchor client, record the live streaming source data as a video file, and store the recorded video file into a storage server; receive a live video stream transmitted by the replay server, and transmit the live video stream to the user client. The platform control server is configured to send a replay request to the replay server, where the replay request is directed to a specified video file in the storage server.

As can be seen from the above, in the technical solutions provided by the present disclosure, when the anchor client uploads the live streaming source data to the live streaming server, the live streaming server may record the live streaming source data as a video file and store the recorded video file in the storage server. In this way, when a video that has already been live-streamed needs to be replayed, the platform control server may send a replay request to the replay server, thereby allowing the replay server to retrieve the corresponding specified video file from the storage server. When presenting the recorded specified video file to the user, in order to build a live streaming experience for the user, the replay server may convert the specified video file into a live video stream, and transmit the live video stream to the live streaming server. In this way, the live streaming server can transmit the live video stream to the user client, to allow the user to re-watch it in a manner of live video streaming. This not only satisfies the user's requirement of video replay, but also ensures the user's experience of live video streaming.

BRIEF DESCRIPTION OF THE DRAWINGS

To make the technical solutions in the embodiments of the present disclosure clearer, a brief introduction of the accompanying drawings consistent with descriptions of the embodiments will be provided hereinafter. It is to be understood that the following described drawings are merely some embodiments of the present disclosure. Based on the accompanying drawings and without creative efforts, persons of ordinary skill in the art may derive other drawings.

DETAILED DESCRIPTION

To make the objectives, technical solutions and advantages of the present disclosure clearer, specific embodiments of the present disclosure will be made in detail with reference to the accompanying drawings.

Embodiment 1

Figure 1:
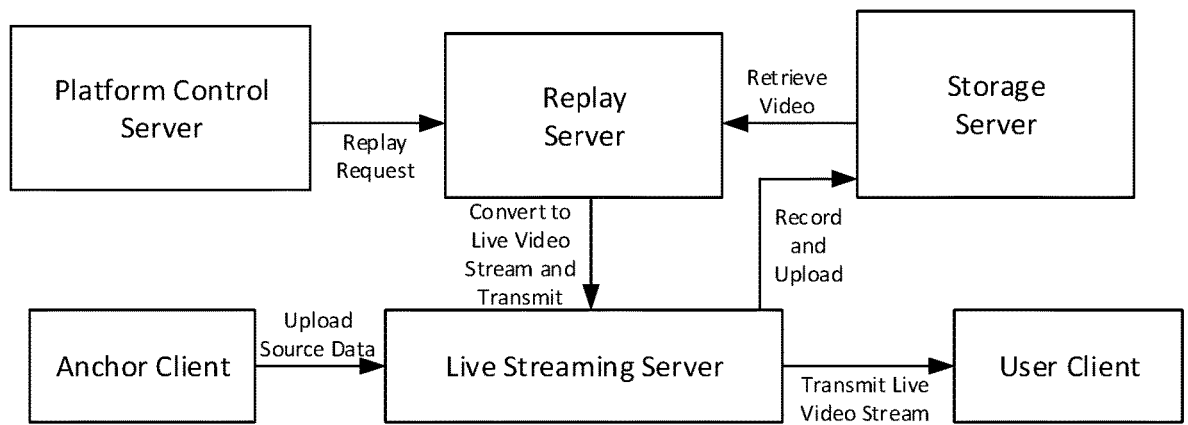
FIG. 1 illustrates a schematic diagram of a system architecture consistent with the Embodiment 1 of the present disclosure.

Referring to FIG. 1, a replay method of live videos provided by the present disclosure may be applied to the system architecture shown in FIG. 1. The system may include an anchor client, a live streaming server, a platform control server, a replay server, a storage server, and a user client.

In one example, both the anchor client and the user client may be an electronic device with network communication and data processing functions. For example, the anchor client and the user client may be a desktop computer, a tablet, a laptop, a smartphone, a digital assistant, a smart wearable device, etc.

In one example, the live streaming server may be a server or a server cluster for improving the loading speed of live videos. Specifically, the live streaming server may be a server cluster based on a CDN (Content Delivery Network). The server cluster may have multiple edge nodes, and these edge nodes may have different geographical locations and network environments. In this way, when an anchor client needs to upload live streaming source data to the live streaming server, the anchor client can select an edge node that matches its own network environment and geographic location to establish the connection. This may allow the established connection to have a relatively small network delay, and thus have a relatively high data upload speed. Similarly, when a user client receives the live video stream transmitted by the live streaming server, the user client can also select an edge node that matches its own network environment and geographic location to establish the connection, and thus can have a relatively high data download speed.

In one example, the replay server may be a server for receiving replay requests and retrieving recorded video files. The replay server may be connected to the live streaming server, so that the retrieved completely recorded video files may be provided to the live streaming server. The replay server may also be connected to the platform control server and the storage server. The platform control server may be a business server of a live streaming platform. The platform control server may send a replay request to the replay server, thereby determining the video file to be replayed, the number of times and the duration of the requested replay, etc. The storage server may store video files that have been recorded.

Figure 2:
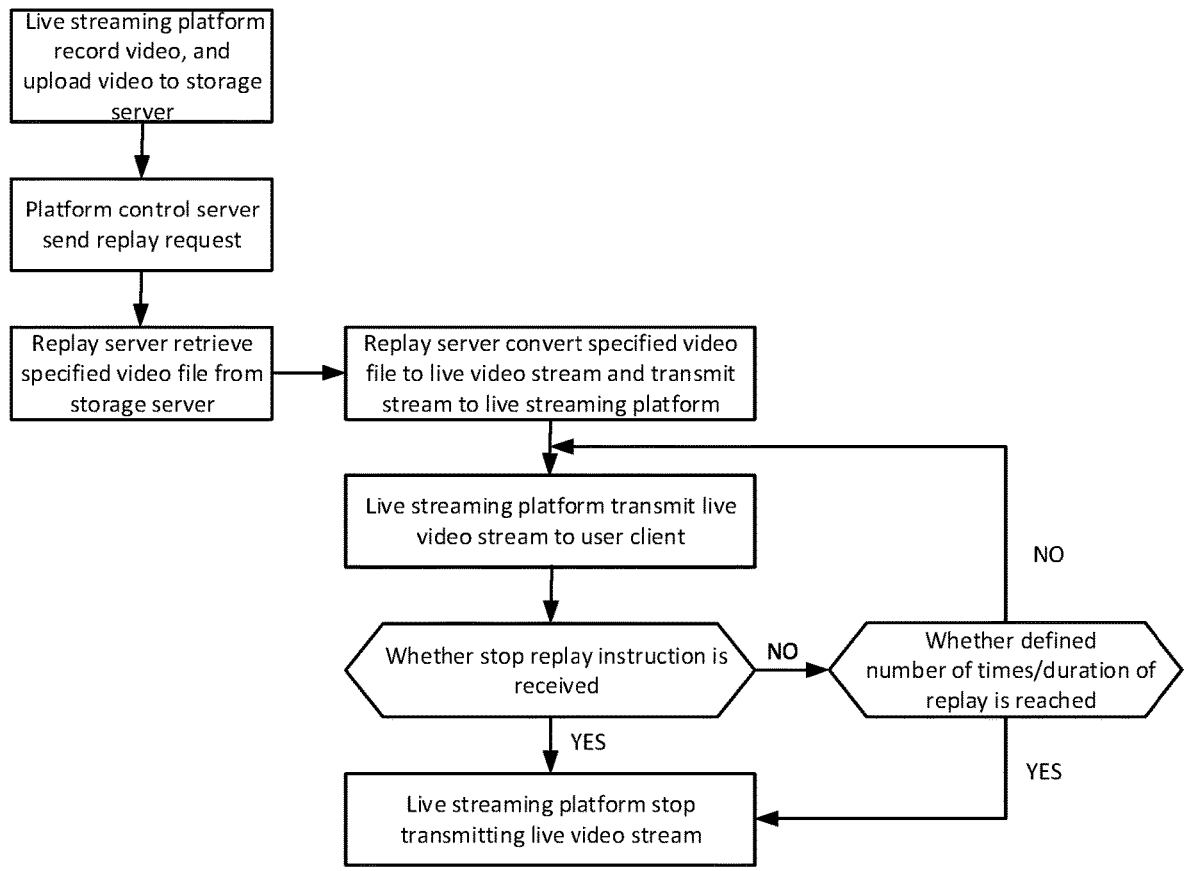
FIG. 2 illustrates a flow chart of an example of a replay method of live videos consistent with Embodiment 1 of the present disclosure.

Referring to FIG. 2, the present disclosure provides a replay method of live videos. The replay method may be executed by the foregoing replay server, and may include following steps:

S11: receiving a replay request sent by a platform control server, the replay request being directed to a specified video file in a storage server, where the specified video file is obtained after a live streaming server records a live video, and the specified video file is uploaded to the storage server by the live streaming server.

In one example, when a live streaming platform needs to replay a video file that has already been recorded, it may send a replay request to a replay server. Specifically, the replay server may provide a designated invocation interface to the platform control server in advance. When the platform control server needs to send a replay request, it may invoke the designated invocation interface. When the designated invocation interface is invoked, the replay server may respond to the invocation request directed to the designated invocation interface started by the platform control server, and initiate a video replay service. After the video replay service is initiated, the replay server can execute a series of processes for replaying a live video.

In one example, the replay request sent by the platform control server may be directed to a specified video file in the storage server. The specified video file may be the video file requested for replay. Specifically, the replay request may include an identifier of the specified video file. The identifier may be, for example, a download link of the specified video file. In practical applications, the download link may be a storage path of the specified video file in the storage server.

S13: retrieving, from the storage server, the specified video file to which the replay request is directed.

In one example, after receiving the replay request, the replay server may retrieve the corresponding specified video file from the storage server based on the identifier of the specified video file included in the replay request. Specifically, the replay server may send a network request including the storage path to the storage server. In this way, after receiving the network request, the storage server may extract the storage path included in the request and locally retrieve the specified video file under the storage path. After retrieving the specified video file, the storage server may feed back the specified video file to the replay server.

S15: converting the specified video file to a live video stream, and transmitting the live video stream to the live streaming server, thereby allowing the live streaming server to transmit the live video stream to a user client.

In one example, after the replay server retrieves the specified video file, the replay server may transmit the specified video file to the live streaming server. In this way, the live streaming server may transmit the specified video file to the user client. The specified video file may then be watched on the user client. However, according to this approach, for the video watched on the user client, the playing progress can be freely selected, thereby sacrificing the experience of watching live videos. For example, a user may have missed a live ball game, and when watching the replay, the user may still prefer a live streaming experience, without freely selecting the playing progress of the game.

Based on this, in one example, the replay server may convert the specified video file into a live video stream. The live video stream may be a data stream that complies with a streaming media transmission protocol. The streaming media transmission protocol may be, for example, a mms (Microsoft Media Server) protocol, a rstp protocol (Rapid Spanning Tree Protocol), a P2P (Peer to Peer) protocol, etc. After converting the specified video file into the live video stream, the replay server may transmit the live video stream to the live streaming server. In this way, the live streaming server may transmit the live video stream to the user client. When watching the replayed video file on the user client, the user can also have a live streaming experience.

Referring to FIG. 2, in one example of the present disclosure, during the replay of the specified video file, the platform control server may, at any time, issue a stop replay instruction to the replay server. In this way, the replay server may receive the stop replay instruction sent by the platform control server. Further, the replay server may forward the stop replay instruction to the live streaming server currently playing a live video stream, so that the live streaming server stops transmitting the live video stream to the user client.

In one example of the present disclosure, sometimes the platform control server can also define the number of times of the video replay or the duration of the video replay when requesting to replay a specific video file. Based on this, in one example, the replay request may include replay cutoff parameters, as illustrated in the figure. The replay cutoff parameters are used to limit the number of times or duration of replay of the live video stream transmitted to the user client. The replay cutoff parameters may be sent to the live streaming server by the replay server. In this way, when the number of times of replay of the live video stream reaches the defined number of times of replay or the duration of replay reaches the defined duration of replay, the live streaming server may stop transmitting the live video stream to the user client.

Figure 3:
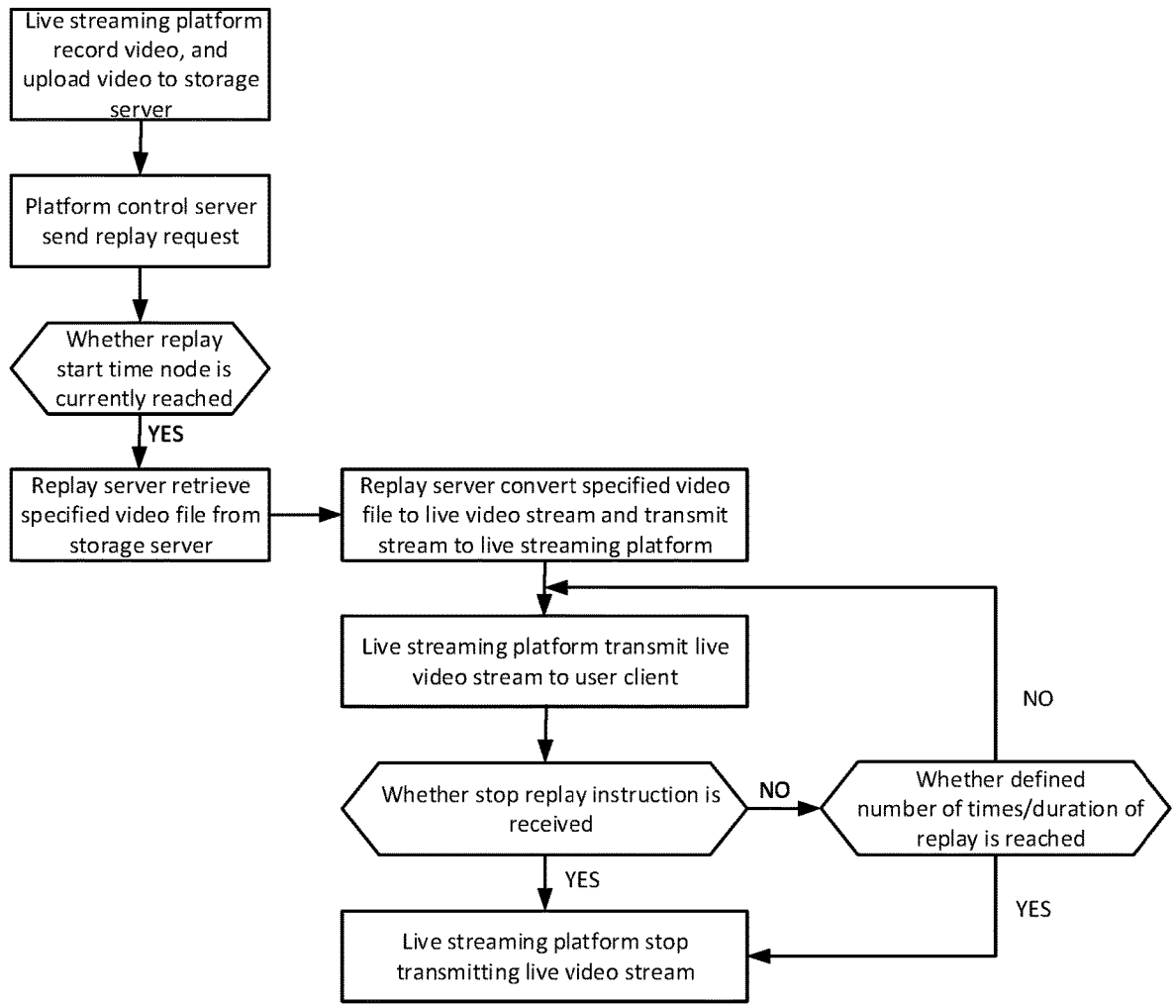
FIG. 3 illustrates a flow chart of another example of a replay method of live videos consistent with Embodiment 1 of the present disclosure.

Referring to FIG. 3, in one example of the present disclosure, when the platform control server requests a video replay, the video that needs to be replayed may not have finished the live streaming process. For example, a football match may start at 8:10 and end at 10 o'clock. At 9 o'clock, the platform control server can make an appointment to replay this football match at 10:20. In this situation, the replay request sent to the replay server by the platform control server may include a replay start time node. Thus, after receiving the replay request and extracting the replay start time node in the request, the replay server may determine whether the current time node reaches the replay start time node. If the replay start time node is reached, the replay server may retrieve a specified video file to which the replay request is directed from the storage server, and start the process of replaying the specified video file.

In one example of the present disclosure, other than requesting to replay a single video file, the platform control server may request to replay a plurality of video files. For example, the platform control server may request to replay videos of all four games of the NBA Finals. In this situation, the replay request sent by the platform control server may be directed to at least two specified video files in the storage server. The at least two specified video files may form a to-be-replayed video playlist. Each of the specified video files may correspond to a playing sequence number. For example, for the four games of the NBA Finals in the current replay request, the video for each game may be assigned with a corresponding playing sequence number according to the sequence of the actual time of the game. In this condition, after retrieving the at least two specified video files from the storage server, the replay server may transmit the live video streams that respectively correspond to the at least two specified video files to the live streaming server based on playing sequence numbers, thereby allowing the live streaming server to transmit the corresponding live video streams to the user client based on the playing sequence numbers.

In one example, other than receiving the stop replay instruction sent by the platform control server, the live streaming server may also stop transmitting the live video streams to the user client when the live video streams that respectively correspond to the at least two specified video files all finish playing.

Figure 4:
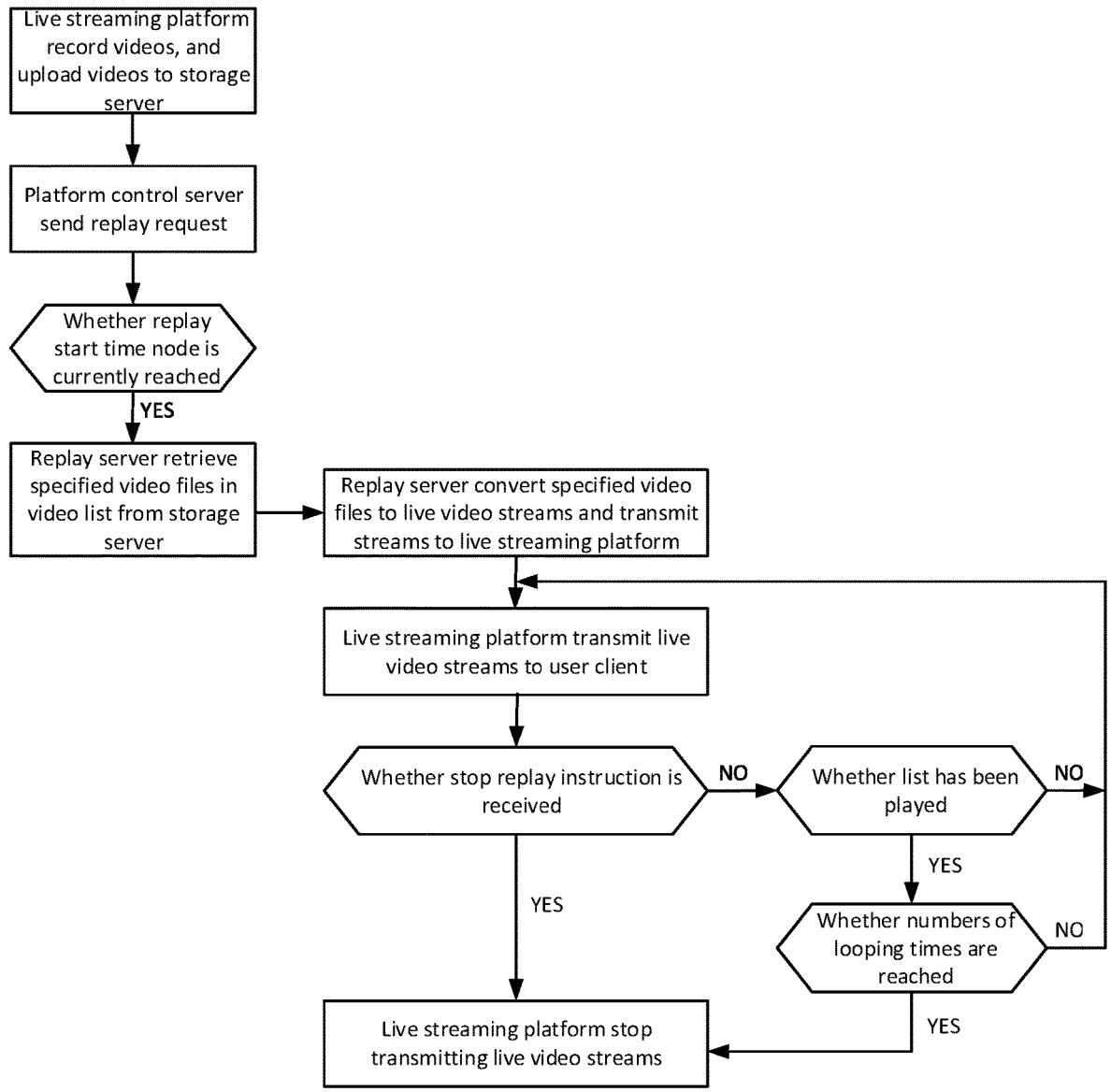
FIG. 4 illustrates a flow chart of another example of a replay method of live videos consistent with the Embodiment 1 of the present disclosure.

Referring to FIG. 4, in one example of the present disclosure, the platform control server may further limit the numbers of times that the specified video files are looped when requesting to replay a plurality of specified video files. In this situation, the replay request may also include corresponding numbers of looping times for the at least two designated video files. For example, the platform control server may request that the four games of the NBA Finals be looped twice. In this way, when the numbers of times of play of all the live video streams that respectively correspond to the at least two specified video files reach the numbers of looping times, the live streaming server may stop transmitting the live video streams to the user client.

Embodiment 2

Figure 5:
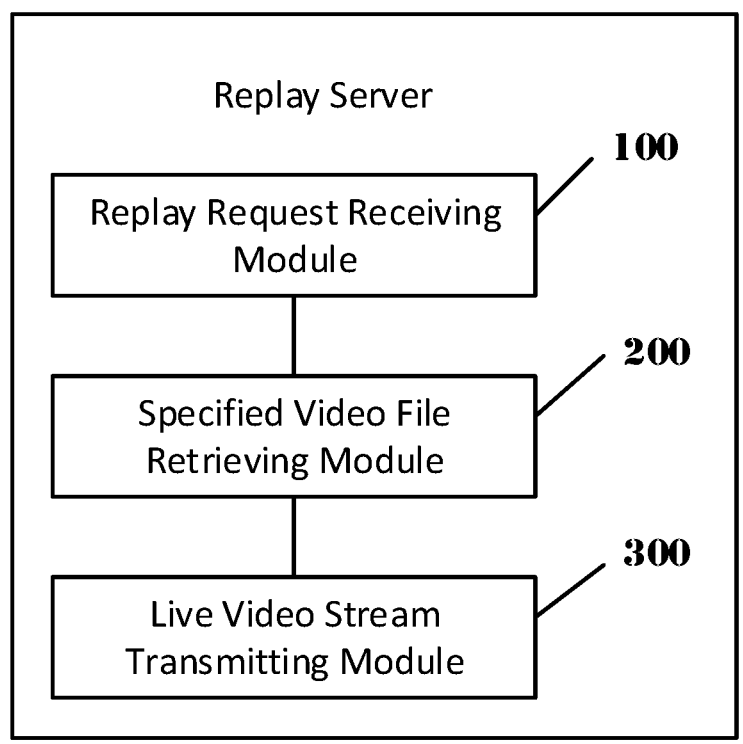
FIG. 5 illustrates a structural schematic diagram of a replay server consistent with Embodiment 2 of the present disclosure.

Referring to FIG. 5, the present disclosure further provides a replay server, where the replay server includes:

a replay request receiving module 100 configured to receive a replay request sent by a platform control server, the replay request being directed to a specified video file in a storage server, where the specified video file is obtained after a live streaming server records a live video, and the specified video file is uploaded to the storage server by the live streaming server;

a specified video file retrieving module 200 configured to retrieve, from the storage server, the specified video file to which the replay request is directed; and a live video stream transmitting module 300 configured to convert the specified video file into a live video stream, and transmit the live video stream to the live streaming server to allow the live streaming server to transmit the live video stream to a user client.

The above replay server is described merely for illustrational purpose. The modules that are described as separate parts may or may not be physically separated, and the parts illustrated as modules may or may not be physical modules. That is, these modules may be located in one location, or distributed across multiple network entities. Based on actual needs, some or all of the modules may be selected to achieve the objectives of the present embodiment, which those of ordinary skill in the art may understand and implement without taking creative efforts.

Embodiment 3

The present disclosure further provides a replay method of live videos, which can be applied to the system architecture shown in FIG. 1. The method includes:

S21: receiving, by a live streaming server, live streaming source data uploaded by an anchor client, recording the live streaming source data as a video file, and storing the recorded video file in a storage server;

S23: sending, by a platform control server, a replay request to a replay server, the replay request being directed to a specified video file in the storage server;

S25: in response to the replay request, retrieving, by the replay server, the specified video file from the storage server;

S27: converting, by the replay server, the specified video file into a live video stream and transmitting the live video stream to the live streaming server; and S29: transmitting, by the live streaming server, the live video stream to a user client.

In one example, the replay request being directed to the specified video file includes:

a storage path in the storage server for the specified video file being included in the replay request.

In one example, the replay request includes replay cutoff parameters, and the replay cutoff parameters are configured to provide a defined number of times of replay or a defined duration of replay of the live video stream transmitted to the user client; and the method further includes:

stopping transmitting, by the live streaming server, the live video stream to the user client when a number of times of reply of the live video stream reaches the defined number of times of replay or a duration of replay reaches the defined duration of replay.

In one example, the replay request includes a replay start time node; and after sending the replay request to the replay server by the platform control server, the method further includes:

determining, by the replay server, whether a current time node reaches the replay start time node; and in response to that the current time node reaches the replay start time node, retrieving the specified video file to which the replay request is directed from the storage server.

In one example, the replay request is directed to at least two specified video files in the storage server, where each of the at least two specified video files has a corresponding playing sequence number; and the method further includes:

transmitting, by the replay server, live video streams that respectively correspond to the at least two specified video files to the live streaming server based on playing sequence numbers; and transmitting, by the live streaming server, the corresponding live video streams to the user client based on the playing sequence numbers.

In one example, the replay request further includes corresponding numbers of looping times for the at least two specified video files; and the method further includes:

stopping transmitting, by the live streaming server, the live video streams to the user client when numbers of times of play of all the live video streams that respectively correspond to the at least two specified video files reach the corresponding numbers of looping times.

Embodiment 4

Referring to FIG. 1, the present disclosure further provides a replay system for live videos. The system includes an anchor client, a live streaming server, a platform control server, a replay server, a storage server, and a user client, where:

the live streaming server is configured to receive live streaming source data uploaded by the anchor client, record the live streaming source data as a video file, store the recorded video file in the storage server, receive a live video stream transmitted by the replay server, and transmit the live video stream to the user client;

the platform control server is configured to send a replay request to the replay server, the replay request being directed to a specified video file in the storage server; and the replay server is configured to retrieve the specified video file from the storage server in response to the replay request; convert the specified video file into a live video stream, and transmit the live video stream to the live streaming server.

Embodiment 5

The present disclosure further provides a replay server for live videos, which can be used to implement the replay methods of Embodiment 1 or Embodiment 3.

As can be seen from the above, in the technical solutions provided by the present disclosure, when the anchor client uploads the live streaming source data to the live streaming server, the live streaming server may record the live streaming source data as a video file and store the recorded video file in the storage server. In this way, when a video that has already been live-streamed needs to be replayed, the platform control server may send a replay request to the replay server, thereby allowing the replay server to retrieve the corresponding specified video file from the storage server. When presenting the recorded specified video file to the user, in order to build a live streaming experience for the user, the replay server may convert the specified video file into a live video stream, and transmit the live video stream to the live streaming server. In this way, the live streaming server can transmit the live video stream to the user client, to allow the user to re-watch it in a manner of live video streaming. This not only satisfies the user's requirement of video replay, but also ensures the user's experience of live video streaming.

The sequence or order of the foregoing embodiments of the present disclosure are merely for descriptive purpose, and does not represent advantages and disadvantages of the embodiments.

Through the foregoing description of the embodiments, it is clear to those skilled in the art that each embodiment can be implemented by means of software plus a necessary general hardware platform, and certainly, by means of hardware as well. Based on this understanding, the technical solutions, or essentially the parts that contribute to the current technology, can be embodied in the form of a software product. This computer software product may be stored in a computer-readable storage medium, such as a ROM/RAM, a magnetic disc, an optical disc, etc., and include a variety of instructions that cause a computing device (which may be a personal computer, a server, or a network device, etc.) to implement each embodiment or methods described in certain parts of each embodiment.

Although the present disclosure has been described as above with reference to preferred embodiments, these embodiments are not constructed as limiting the present disclosure. Any modifications, equivalent replacements and improvements made without departing from the spirit and principle of the present disclosure shall fall within the scope of the protection of the present disclosure.

The invention claimed is:

1. A replay method of live videos, the method comprising:
   receiving a replay request sent by a platform control server, the replay request being directed to a specified video file in a storage server, wherein the specified video file is obtained after a live streaming server records a live video, and the specified video file is uploaded to the storage server by the live streaming server;
   retrieving, from the storage server, the specified video file to which the replay request is directed; and
   converting the specified video file to a live video stream, and transmitting the live video stream to the live streaming server to allow the live streaming server to transmit the live video stream to a user client, wherein the playing progress of the live video stream is not freely selected when the live video stream is being replayed in the user client.

2. The method according to claim 1, wherein the replay request being directed to the specified video file includes:
   a storage path in the storage server for the specified video file being included in the replay request.

3. The method according to claim 1, wherein the platform control server is provided with a designated invocation interface, and the method further includes:
   in response to an invocation request directed to the designated invocation interface started by the platform control server, initiating a video replay service.

4. The method according to claim 1, further comprising:
   receiving a stop replay instruction sent by the platform control server; and
   forwarding the stop replay instruction to the live streaming server to allow the live streaming server to stop transmitting the live video stream to the user client.

5. The method according to claim 1, wherein the replay request includes replay cutoff parameters, and the replay cutoff parameters are configured to provide a defined number of times of replay or a defined duration of replay of the live video stream transmitted to the user client; and the method further includes:
   stopping transmitting the live video stream to the user client when a number of times of reply of the live video stream reaches the defined number of times of replay or a duration of replay reaches the defined duration of replay.

6. The method according to claim 1, wherein the replay request includes a replay start time node; and after receiving the replay request sent by the platform control server, the method further includes:
   determining whether a current time node reaches the replay start time node; and in response to that the current time node reaches the replay start time node, retrieving the specified video file to which the replay request is directed from the storage server.

7. The method according to claim 1, wherein the replay request is directed to at least two specified video files in the storage server, wherein each of the at least two specified video files has a corresponding playing sequence number; and the method further includes:
transmitting live video streams that respectively correspond to the at least two specified video files to the live streaming server based on playing sequence numbers, to allow the live streaming server to transmit the corresponding live video streams to the user client based on the playing sequence numbers.

8. The method according to claim 7, further comprising:
stopping transmitting the live video streams to the user client when all the live video streams that respectively correspond to the at least two specified video files finish playing.

9. The method according to claim 7, wherein the replay request further includes corresponding numbers of looping times for the at least two specified video files; and the method further includes:
stopping transmitting the live video streams to the user client when numbers of times of play of all the live video streams that respectively correspond to the at least two specified video files reach the corresponding numbers of looping times.

10. A replay server, comprising:
a replay request receiving module, configured to receive a replay request sent by a platform control server, the replay request being directed to a specified video file in a storage server, wherein the specified video file is obtained after a live streaming server records a live video, and the specified video file is uploaded to the storage server by the live streaming server;
a specified video file retrieving module, configured to retrieve, from the storage server, the specified video file to which the replay request is directed; and
a live video stream transmitting module, configured to convert the specified video file into a live video stream, and transmit the live video stream to the live streaming server to allow the live streaming server to transmit the live video stream to a user client, wherein the playing progress of the live video stream is not freely selected when the live video stream is being replayed in the user client.

11. A replay method of live videos, the method comprising:
receiving, by a live streaming server, live streaming source data uploaded by an anchor client, recording the live streaming source data as a video file, and storing the recorded video file in a storage server;
sending, by a platform control server, a replay request to a replay server, the replay request being directed to a specified video file in the storage server;
in response to the replay request, retrieving, by the replay server, the specified video file from the storage server;
converting, by the replay server, the specified video file into a live video stream and transmitting the live video stream to the live streaming server; and
transmitting, by the live streaming server, the live video stream to a user client, wherein the playing progress of the live video stream is not freely selected when the live video stream is being replayed in the user client.

12. The method according to claim 11, wherein the replay request being directed to the specified video file includes:
a storage path in the storage server for the specified video file being included in the replay request.

13. The method according to claim 11, wherein the replay request includes replay cutoff parameters, and the replay cutoff parameters are configured to provide a defined number of times of replay or a defined duration of replay of the live video stream transmitted to the user client; and the method further includes:
stopping transmitting, by the live streaming server, the live video stream to the user client when a number of times of reply of the live video stream reaches the defined number of times of replay or a duration of replay reaches the defined duration of replay.

14. The method according to claim 11, wherein the replay request includes a replay start time node; and after sending the replay request to the replay server by the platform control server, the method further includes:
determining, by the replay server, whether a current time node reaches the replay start time node; and
in response to that the current time node reaches the replay start time node, retrieving the specified video file to which the replay request is directed from the storage server.

15. The method according to claim 11, wherein the replay request is directed to at least two specified video files in the storage server, wherein each of the at least two specified video files has a corresponding playing sequence number; and the method further includes:
transmitting, by the replay server, live video streams that respectively correspond to the at least two specified video files to the live streaming server based on playing sequence numbers; and
transmitting, by the live streaming server, the corresponding live video streams to the user client based on the playing sequence numbers.

16. The method according to claim 15, wherein the replay request further includes corresponding numbers of looping times for the at least two specified video files; and the method further includes:
stopping transmitting, by the live streaming server, the live video streams to the user client when numbers of times of play of all the live video streams that respectively correspond to the at least two specified video files reach the corresponding numbers of looping times.

17. A replay system for live videos comprising a replay server configured to:
receive a replay request sent by a platform control server, the replay request being directed to a specified video file in a storage server, wherein the specified video file is obtained after a live streaming server records a live video, and the specified video file is uploaded to the storage server by the live streaming server;
retrieve, from the storage server, the specified video file to which the replay request is directed; and
convert the specified video file to a live video stream, and transmit the live video stream to the live streaming server to allow the live streaming server to transmit the live video stream to a user client, wherein the playing progress of the live video stream is not freely selected when the live video stream is being replayed in the user client.

18. The system according to claim 17, further comprising:
the live streaming server configured to receive live streaming source data uploaded from an anchor client, record the live streaming source data as a video file, store the recorded video file into the storage server, receive the live video stream transmitted by the replay server, and transmit the live video stream to the user client; and the platform control server configured to send the replay request to the replay server.

19. The system according to claim 17, wherein the replay request being directed to the specified video file includes:

a storage path in the storage server for the specified video file being included in the replay request.

20. The system according to claim 17, wherein the platform control server is provided with a designated invocation interface, and the method further includes:

in response to an invocation request directed to the designated invocation interface started by the platform control server, initiating a video replay service.

* * * * *